United States Patent
Watanabe et al.

(10) Patent No.: US 10,044,226 B2
(45) Date of Patent: Aug. 7, 2018

(54) WIRELESS POWER TRANSMITTER

(71) Applicant: ROHM CO., LTD., Kyoto (JP)

(72) Inventors: Masatoshi Watanabe, Kyoto (JP); Takeshi Nozawa, Kyoto (JP); Tatsuya Iwasaki, Kyoto (JP); Manabu Miyata, Kyoto (JP)

(73) Assignee: ROHM CO., LTD, Kyoto (JP)

( * ) Notice: Subject to any disclaimer, the term of this patent is extended or adjusted under 35 U.S.C. 154(b) by 1034 days.

(21) Appl. No.: 14/292,044

(22) Filed: May 30, 2014

(65) Prior Publication Data
US 2014/0354066 A1  Dec. 4, 2014

(30) Foreign Application Priority Data

Jun. 3, 2013  (JP) .................................. 2013-117304

(51) Int. Cl.
*H02J 50/12*  (2016.01)
*H02J 5/00*  (2016.01)
(Continued)

(52) U.S. Cl.
CPC .............. *H02J 50/12* (2016.02); *H02J 5/005* (2013.01); *H04B 5/0031* (2013.01);
(Continued)

(58) Field of Classification Search
CPC . H02J 5/005; H02J 7/025; H02J 17/00; H04B 5/0025–5/0093; B60L 11/182;
(Continued)

(56) References Cited

U.S. PATENT DOCUMENTS

| | | | | |
|---|---|---|---|---|
| 2010/0001847 A1* | 1/2010 | Takaishi | ............... | G06K 7/0008 340/10.34 |
| 2012/0329405 A1* | 12/2012 | Lee | ......................... | H02J 17/00 455/73 |
| 2013/0140906 A1* | 6/2013 | Tanabe | .................... | H02J 17/00 307/104 |

FOREIGN PATENT DOCUMENTS

| | | |
|---|---|---|
| EP | 02066000 A2 | 12/1986 |
| JP | 2008141816 A | 6/2008 |
| (Continued) | | |

OTHER PUBLICATIONS

Japanese Notification of Reasons for Refusal corresponding to Application No. 2013-117304; dated Nov. 29, 2016, with English translation.

*Primary Examiner* — Rexford Barnie
*Assistant Examiner* — Thai Tran
(74) *Attorney, Agent, or Firm* — Cantor Colburn LLP (57) ABSTRACT

A first oscillator is configured to be switchable between a disabled state and an oscillation state in which a first clock signal CLK1 having a first frequency is generated. A second oscillator oscillates at a second frequency that is lower than the first frequency, so as to generate a second clock signal. In (i) a power transfer phase in which electric power is transmitted to a wireless power receiving apparatus, a controller instructs the first oscillator to oscillate, and generates a first pulse signal for controlling a driver according to the first clock signal. In (ii) a selection phase in which the presence or absence of the wireless power receiving apparatus is detected, the controller generates a second pulse signal for controlling the driver at a predetermined time interval, which is measured based on the second clock signal, and during which the first oscillator is set to the disabled state.

11 Claims, 6 Drawing Sheets

(51) Int. Cl.
   *H04B 5/00*     (2006.01)
   *H02J 50/80*    (2016.01)
   *H02J 7/02*     (2016.01)

(52) U.S. Cl.
   CPC ......... *H04B 5/0037* (2013.01); *H04B 5/0075* (2013.01); *H02J 7/025* (2013.01)

(58) Field of Classification Search
   CPC ........... B60L 11/1829–11/1831; Y02T 90/122; H01F 38/14; H01F 2038/143–2038/146; A61B 1/00029; A61N 1/3787
   USPC .......................................... 307/104; 320/108
   See application file for complete search history.

(56) References Cited

FOREIGN PATENT DOCUMENTS

| | | |
|---|---|---|
| JP | 2009136132 A | 6/2009 |
| JP | 2011091315 A | 5/2011 |
| JP | 2013-38854 A | 2/2013 |

\* cited by examiner

WIRELESS POWER TRANSMITTER

The present invention claims priority under 35 U.S.C. § 119 to Japanese Application No. 2013-117304 filed Jun. 3, 2013, the entire content of which is incorporated herein by reference.

BACKGROUND OF THE INVENTION

1. Field of the Invention

The present invention relates to a wireless power supply technique.

2. Description of the Related Art

In recent years, in order to supply electric power to an electronic device, contactless power transmission (which is also referred to as "contactless power supply" or "wireless power supply") has begun to come into commonplace use. In order to advance the compatibility of products between manufacturers, the WPC (Wireless Power Consortium) has been organized, and the WPC has developed the Qi standard as an international standard.

Figure 1:
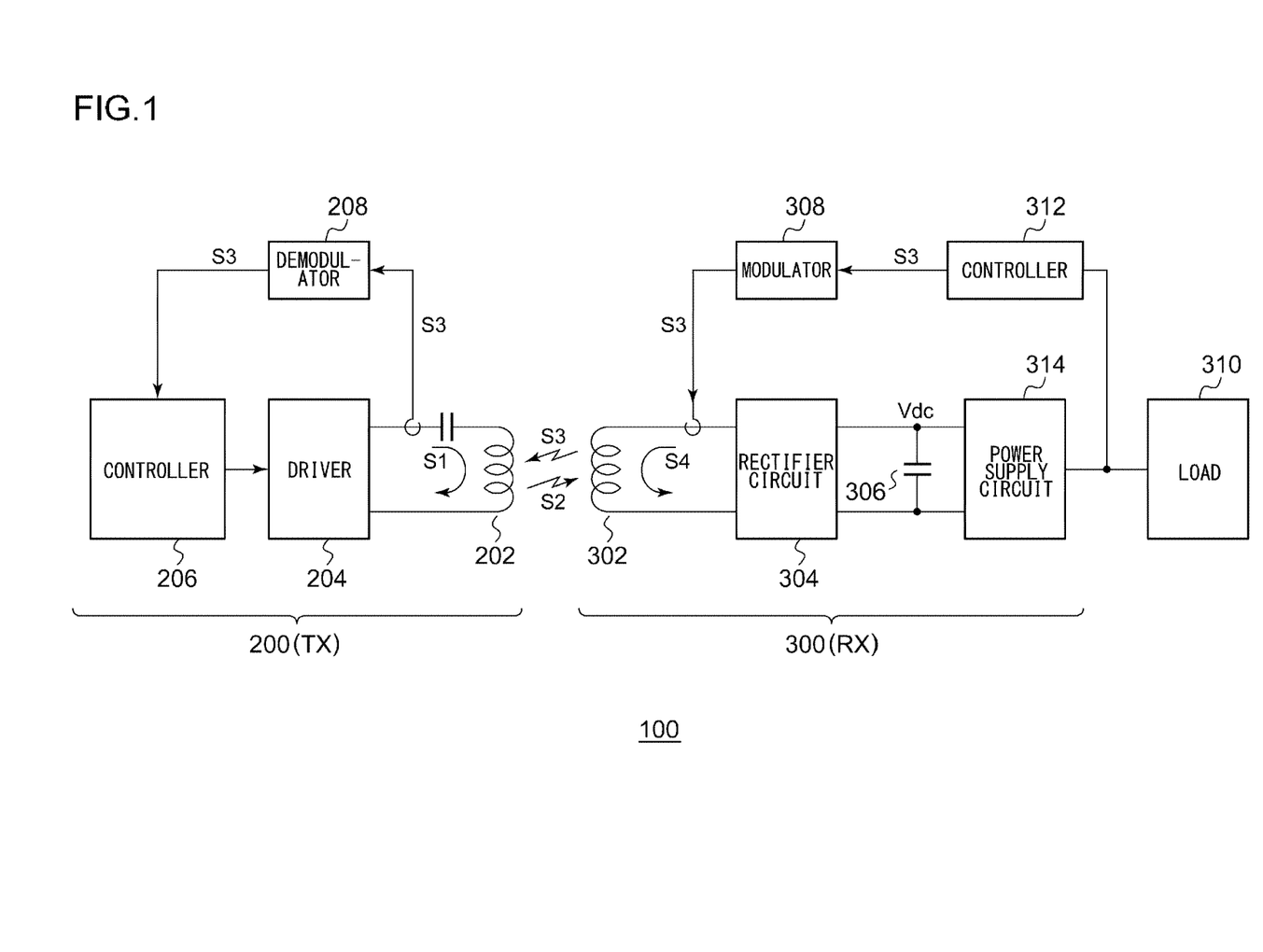
FIG. 1 is a diagram showing a configuration of a wireless power supply system that conforms to the Qi standard.

FIG. 1 is a diagram showing a configuration of a wireless power supply system 100 that conforms to the Qi standard. The power supply system 100 includes a power transmission apparatus 200 (TX, Power Transmitter) and a power receiving apparatus 300 (RX, Power Receiver). The power receiving apparatus 300 is mounted on an electronic device, examples of which include cellular phone terminals, smartphones, audio players, game machines, and tablet terminals.

The power transmission apparatus 200 includes a transmission coil (primary coil) 202, a driver 204, a controller 206, and a demodulator 208. The driver 204 includes an H-bridge circuit (full-bridge) circuit or otherwise a half-bridge circuit. The driver 204 applies a driving signal S1 in the form of a pulse signal to the transmission coil 202 such that a driving current flows through the transmission coil 202, thereby generating an electric power signal S2 in the form of an electromagnetic signal. The controller 206 integrally controls the overall operation of the power transmission apparatus 200. Specifically, the controller 206 controls the switching frequency of the driver 204 or otherwise the duty ratio of the switching of the driver 204 so as to adjust the electric power to be transmitted.

In the Qi standard, a protocol is defined for communication between the power transmission apparatus 200 and the power receiving apparatus 300, which enables information transmission from the power receiving apparatus 300 to the power transmission apparatus 200 via a control signal S3. The control signal S3 is transmitted from a reception coil 302 (secondary coil) to the transmission coil 202 in the form of an AM (Amplitude Modulation) modulated signal using backscatter modulation. The control signal S3 includes electric power control data (which will also be referred to as a "packet") which indicates an amount of electric power to be supplied to the power receiving apparatus 300, and data which indicates the particular information for identifying the power receiving apparatus 300. The demodulator 208 demodulates the control signal S3 included in the current or otherwise the voltage applied to the transmission coil 202. The controller 206 controls the driver 204 based on the power control data included in the control signal S3 thus demodulated.

The power receiving apparatus 300 includes the reception coil 302, a rectifier circuit 304, a capacitor 306, a modulator 308, a load circuit 310, a controller 312, and a power supply circuit 314. The reception coil 302 receives the electric power signal S2 from the transmission coil 202, and transmits the control signal S3 to the transmission coil 202. The rectifier circuit 304 and the capacitor 306 rectify and smooth a current S4 induced at the reception coil 302 according to the electric power signal S2, thereby converting the current S4 into a DC voltage.

Using electric power supplied from the power transmission apparatus 200, the power supply circuit 314 charges an unshown secondary battery or steps up or otherwise step down the DC voltage Vdc, so as to supply the DC voltage to the controller 312 and other load circuits 310.

The controller 312 monitors the amount of electric power supplied to the power receiving apparatus 300, and accordingly generates electric power control data which indicates the amount of power transmission. The modulator 308 modulates the control signal S3 including the electric power control data so as to modulate the coil current that flows through the reception coil 302, thereby modulating the coil current and coil voltage applied to the transmission coil 202.

Figure 2:
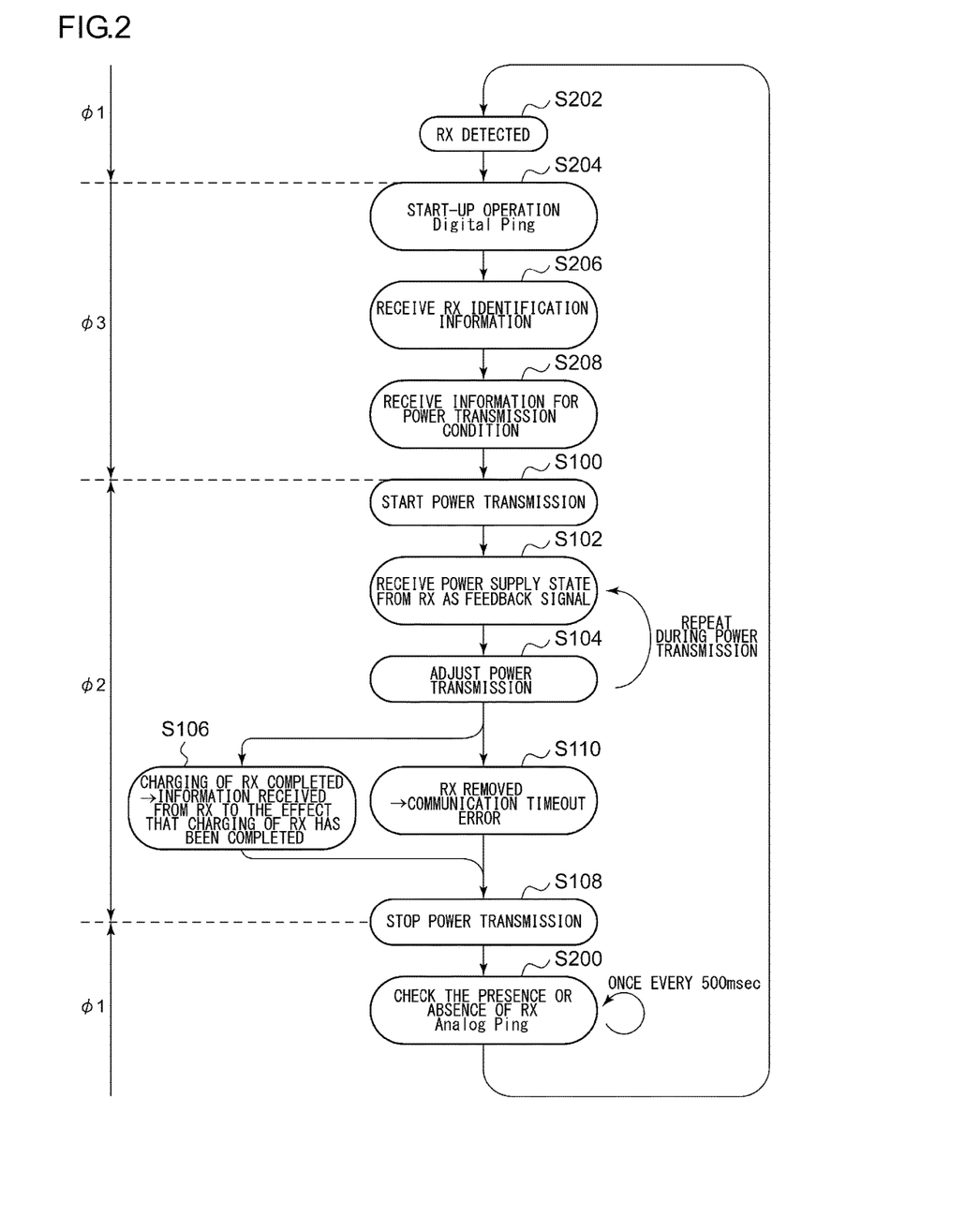
FIG. 2 is a flowchart showing an operation sequence of a power transmission apparatus.

The above is the configuration of the power supply system 100. FIG. 2 is a flowchart showing an operation sequence of the power transmission apparatus 200. The states of the power transmission apparatus 200 can be roughly classified into three phases, i.e., a selection phase $\phi 1$, a power transfer phase $\phi 2$, and an identification and configuration phase $\phi 3$.

First, description will be made regarding the power transfer phase $\phi 2$. The power transmission apparatus 200 (TX) starts to supply electric power to the power receiving apparatus 300 (RX) (S100). The power transmission apparatus TX receives the control signal S3 from the power receiving apparatus RX as a feedback signal which indicates the current power transmission state (S102). The power transmission apparatus TX adjusts the amount of power transmission based on the control signal S3 (S104).

When the power transmission apparatus TX receives, from the power receiving apparatus RX, the control signal S3 indicating that charging is complete (S106), or otherwise detects, based on a communication timeout error, that the power receiving apparatus RX has been removed from the area where it can receive electric power from the power transmission apparatus TX (S108), the power transmission apparatus TX stops the power transmission, and enters the selection phase $\phi 1$.

Next, description will be made regarding the selection phase $\phi 1$. The power transmission apparatus TX transmits the electric power signal S2 at a predetermined time interval (object detection interval, e.g., every 500 msec), so as to check for the presence or absence of the power receiving apparatus RX (S200). This phase will be referred to as the "analog ping phase".

When the power receiving apparatus RX is detected (S202), the power transmission apparatus TX transits to the identification and configuration phase $\phi 3$, and a digital ping phase is executed (S204). Subsequently, in the identification and configuration phase $\phi 3$, the power transmission apparatus TX receives identification information for the power receiving apparatus RX (S206). Subsequently, the power receiving apparatus RX transmits the information with respect to the power transmission conditions to the power transmission apparatus TX (S208). In this stage, the power transmission apparatus TX transits to the power transfer phase $\phi 2$. The above is the operation sequence of the power transmission apparatus 200.

RELATED ART DOCUMENTS

Patent Documents

Patent Document 1

Japanese Patent Application Laid Open No. 2013-38854

The present inventors have investigated such a power transmission system 100, and have come to recognize the following problem.

SUMMARY OF THE INVENTION

Figure 3:
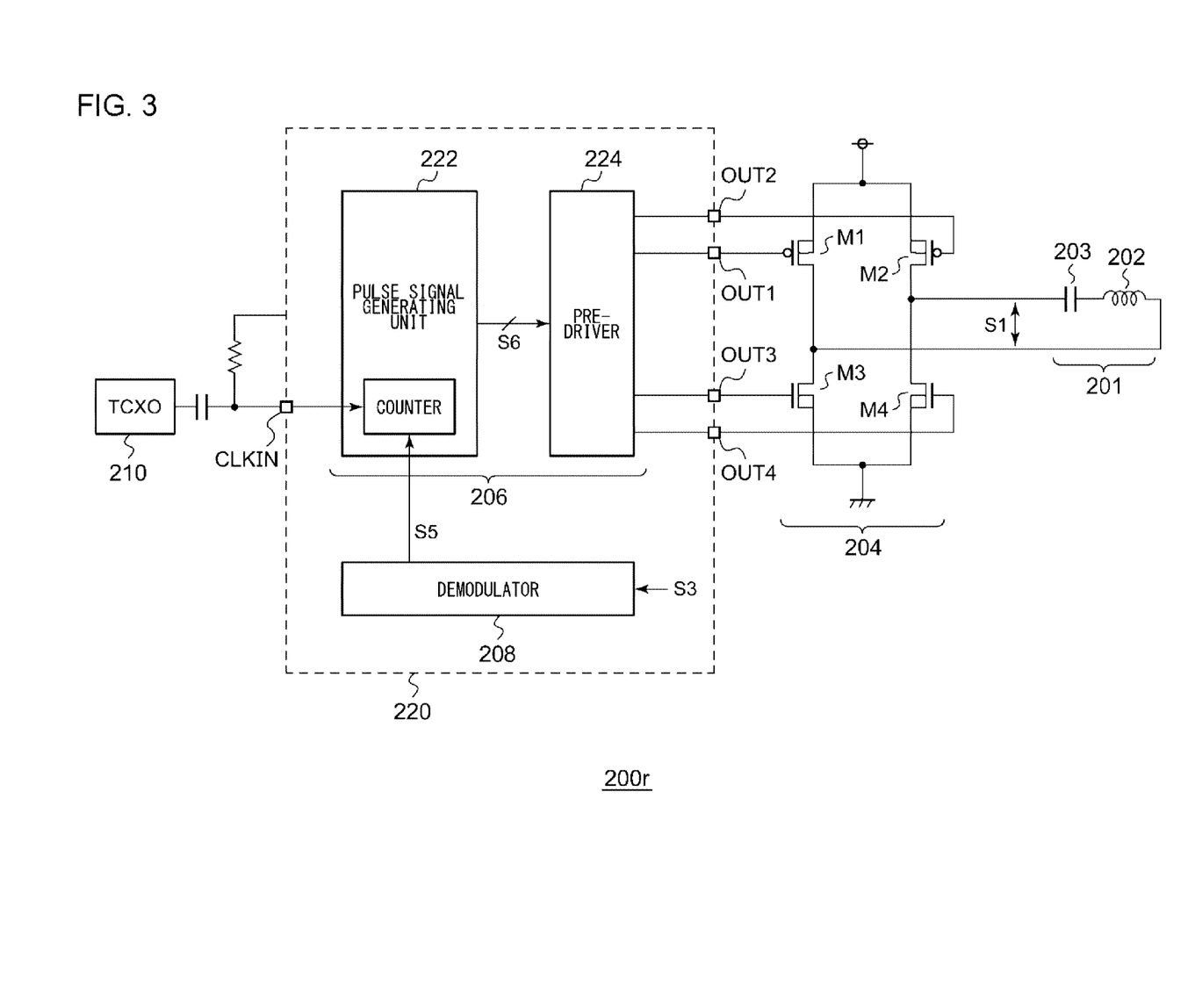
FIG. 3 is a circuit diagram showing a configuration of a power transmission apparatus investigated by the present inventors.

FIG. 3 is a circuit diagram showing a configuration of a power transmission apparatus 200r investigated by the present inventors.

The power transmission apparatus 200r includes a transmission antenna 201, a driver 204, a control circuit 220, and an external oscillator 210.

The transmission antenna 201 includes a transmission coil 202 and a resonance capacitor 203 connected in series. The transmission antenna 201 has a particular resonance frequency fr. The driver 204 is configured as an H-bridge circuit (M1 through M4) including transistors M1 through M4, and applies a driving signal S1 having a rectangular waveform between both ends of the transmission antenna 201. The frequency of the driving signal S1 is set to a value in the vicinity of the resonance frequency fr of the transmission antenna 201.

The control circuit 220 includes a controller 206 and a demodulator 208, and is monolithically integrated on a single semiconductor chip.

The external oscillator is configured to oscillate at a predetermined frequency so as to generate a clock signal CLK. The clock signal CLK is input to a clock input (CLKIN) terminal of the control circuit 220. An internal block of the control circuit 220 performs signal processing in synchronization with the clock signal CLK.

As described with reference to FIG. 1, the demodulator 208 demodulates the control signal S3 transmitted from the power receiving apparatus 300. The electric power control data S5, which is a data component of the control signal S3 which indicates an amount of electric power to be transmitted by the power transmission apparatus 200, is supplied to the controller 206.

The controller 206 includes a pulse signal generating unit 222 and a pre-driver 224. Based on the electric power control data S5, the pulse signal generating unit 222 generates a pulse signal S6 configured as an instruction to switch on and off the transistors M1 through M4. The pre-driver 224 performs switching of the transistors M1 through M4 of the driver 204 according to the pulse signal S6.

With the power transmission apparatus 200 shown in FIG. 1, the electric power transmission is adjusted according to the frequency of the driving signal S1 applied by the driver 204 to the transmission coil 202, i.e., the frequency of the pulse signal S6. Specifically, as the frequency of the pulse signal S6 becomes closer to the resonance frequency of the antenna including the transmission coil 202, the amount of power transmission becomes greater. Conversely, as the difference between the frequency of the pulse signal S6 and the resonance frequency becomes greater, the amount of power transmission becomes smaller. That is to say, the pulse signal generating unit 222 adjusts the frequency of the pulse signal S6 based on the electric power control data S5.

The pulse signal generating unit 222 is configured as a digital counter, for example. The pulse signal generating unit 222 counts the clock signal CLK so as to generate the pulse signal S6 having a frequency (period) that corresponds to the electric power control data S5.

With such an arrangement, there is a demand for the power transmission apparatus 200r to provide a high-precision power control operation. Thus, the power transmission apparatus 200r is required to adjust the frequency of the pulse signal S6 with high resolution. In order to conform to the Qi standard, there is a need to adjust the frequency of the driving signal S1 with a resolution on the order of 0.4 kHz in the vicinity of 110 kHz. Thus, such an arrangement requires the clock signal CLK to have a frequency on the order of several tens of MHz.

Typically, the current consumption of the external oscillator 210 changes according to its oscillation frequency. Specifically, as the oscillation frequency becomes higher, the consumed current becomes greater. With the power transmission apparatus 200r shown in FIG. 3, such an arrangement requires the external oscillator 210 to operate at all times, leading to a problem of large power consumption.

It should be noted that the configuration of the power transmission apparatus 200r shown in FIG. 3 should not been regarded as a conventional technique. Also, the problems described above are by no means within the scope of the common and general knowledge of those skilled in this art.

The present invention has been made in order to solve such a problem. Accordingly, it is an exemplary purpose of the present invention to provide a wireless power transmission apparatus having an advantage of reduced power consumption.

An embodiment of the present invention relates to a control circuit employed in a wireless power transmission apparatus comprising a transmission antenna, a driver connected to the transmission antenna, and a first oscillator, and configured to control the driver. The first oscillator is configured to be capable of switching its state according to an enable signal, between a disabled state and an oscillation state in which the first oscillator generates a first clock signal having a first frequency. The control circuit comprises: a second oscillator configured to oscillate at a second frequency that is lower than the first frequency so as to generate a second clock signal; and a controller configured to receive the first clock signal and the second clock signal, and configured such that, (i) in a power transfer phase in which electric power is transmitted to a wireless power receiving apparatus, the enable signal is asserted so as to set the first oscillator to the oscillation state, and a first pulse signal is generated based on the first clock signal so as to control the driver, and such that, (ii) in a selection phase in which the presence or absence of the wireless power receiving apparatus is detected, a second pulse signal is generated at a predetermined time interval so as to control the driver, and the time interval is measured based on the second clock signal, and the enable signal is negated so as to set the first oscillator to the disabled state during the time interval.

The second oscillator is configured to operate at a low oscillation frequency. Thus, the power consumption of the second oscillator is lower than that of the first oscillator. With such an embodiment, during each predetermined time interval in the standby period, the first oscillator is set to the disabled state. Thus, such an arrangement provides the wireless power transmission apparatus with reduced power consumption.

Also, during an object detection period in which the second pulse signal is to be generated in the selection phase, the controller may be configured to negate the enable signal so as to set the first oscillator to the disabled state, and may be configured to generate the second pulse signal based on the second clock signal.

With such an embodiment, during the selection phase, the operation of the first oscillator is completely stopped. Thus, such an arrangement provides further reduced power consumption.

Also, during an object detection period in which the second pulse signal is generated in the selection phase, the controller may be configured to assert the enable signal so as to set the first oscillator to the oscillation state, and may be configured to generate the second pulse signal based on the first clock signal.

With such an embodiment, during the object detection period, the second pulse signal is generated based on the first clock signal having a high frequency. Thus, such an arrangement allows the frequency and the duty ratio of the second pulse signal to be controlled with a high resolution.

Also, with a resonance frequency of the transmission antenna as fr, the second frequency may be set to $2^N \times$fr (N represents an integer).

Also, the second frequency may be set to a value which is equal to the resonance frequency fr of the transmission antenna.

Also, the control circuit may be configured to conform to a Qi standard.

Also, the control circuit may monolithically be integrated on a single semiconductor substrate.

Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants. By integrating the circuit in the form of a single IC, such an arrangement provides an advantage of a reduced circuit area, and an advantage of maintaining uniform circuit element characteristics.

Another embodiment of the present invention relates to a wireless power transmission apparatus. The wireless power transmission apparatus comprises: a transmission antenna; a driver connected to the transmission antenna; a first oscillator configured to be capable of switching its state between a disabled state and an oscillation state in which the first oscillator generates a first clock signal having a first frequency; and any one of the aforementioned control circuits configured to control the driver.

Yet another embodiment of the present invention also relates to a wireless power transmission apparatus. The wireless power transmission apparatus comprises: a transmission antenna; a driver connected to the transmission antenna; a first oscillator configured to be capable of switching its state between a disabled state and an oscillation state in which the first oscillator generates a first clock signal having a first frequency; a second oscillator configured to oscillate at a second frequency that is lower than the first frequency so as to generate a second clock signal; and a controller configured to receive the first clock signal and the second clock signal, and configured such that, (i) in a power transfer phase in which electric power is transmitted to a wireless power receiving apparatus, the first oscillator is set to the oscillation state, and a first pulse signal is generated based on the first clock signal so as to control the driver, and such that, (ii) in a selection phase in which the presence or absence of the wireless power receiving apparatus is detected, a second pulse signal is generated at a predetermined time interval so as to control the driver, and the time interval is measured based on the second clock signal, and the first oscillator is set to the disabled state during the time interval.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

Figure 4:
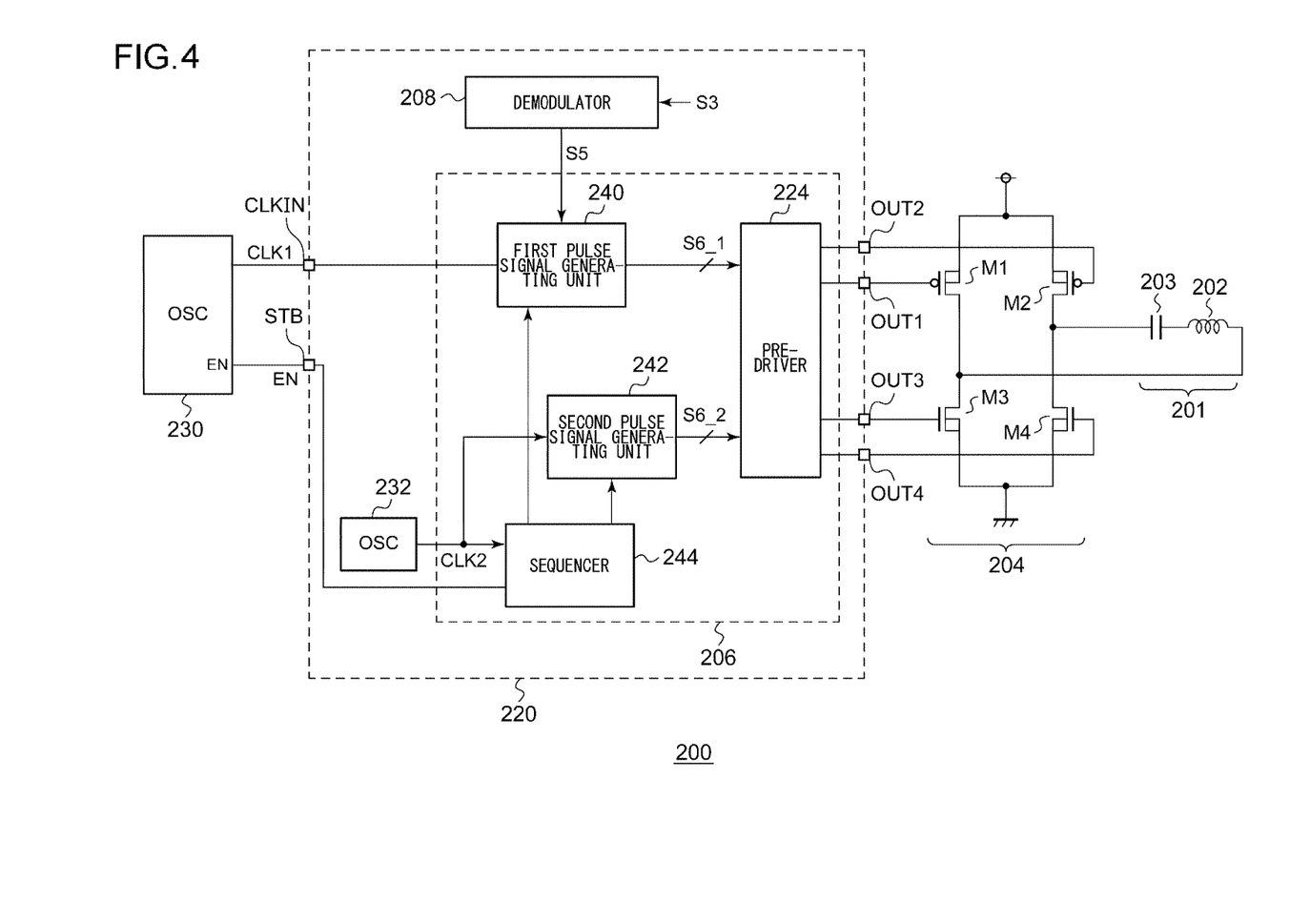
FIG. 4 is a circuit diagram showing a configuration of a wireless power transmission apparatus according to an embodiment.

FIG. 4 is a circuit diagram showing a configuration of a wireless power transmission apparatus (which will simply be referred to as the "power transmission apparatus" hereafter) 200. The transmission apparatus 200 is employed in a power supply system 100 that conforms to the Qi standard as shown in FIG. 1.

The transmission apparatus 200 includes a transmission antenna 201, a driver 204, a control circuit 220, and a first oscillator 230.

The transmission antenna 201 includes a transmission coil (primary coil) 202 and a resonance capacitor 203 connected in series, and configured to have a predetermined resonance frequency fr.

The driver 204 is configured as an H-bridge circuit including transistors M1 through M4. The driver 204 applies, between both ends of the transmission antenna 201, a pulse-shaped driving signal S1 having a frequency in the vicinity of the resonance frequency fr. The driver 204 may be configured as a half-bridge circuit.

The first oscillator 230 includes an enable terminal EN, and is configured to be capable of switching its state between a disabled state and an oscillation state in which the first oscillator 230 generates a first clock signal CLK1 having a first frequency f1. For example, the first oscillator 230 may be configured employing a quartz crystal oscillator such as a TCXO (temperature-compensated quartz crystal oscillator) or the like. Also, other kinds of oscillators may be employed. The oscillation frequency f1 of the first oscillator 230 is set to a high value so as to allow the power transmission apparatus 200 to perform a power control operation with a required high resolution in the power transfer phase. The first clock signal CLK1 is input to the clock input terminal CLKIN of the control circuit 220.

The control circuit 220 includes a controller 206, a demodulator 208, and a second oscillator 232, and is configured as a function IC (Integrated Circuit) monolithically integrated on a single semiconductor substrate. The demodulator 208 demodulates the control signal S3 received from a power receiving apparatus (not shown) via the transmission antenna 201. The controller 206 controls the driver 204 according to the control signal S3 thus demodulated.

The second oscillator 232 is configured to oscillate at a second frequency f2 that is lower than the first frequency f1, so as to generate a second clock signal CLK2.

The controller 206 receives the first clock signal CLK1 and the second clock signal CLK2. In (i) the power transfer phase in which electric power is to be transmitted to the wireless power receiving apparatus (not shown), the controller 206 asserts (set to high level) an enable signal EN1 so as to set the first oscillator 230 to the oscillation state. In this state, according to the first clock signal CLK1 generated by the first oscillator 230, the controller 206 generates a first pulse signal S6_1 for controlling the driver 204.

Furthermore, in (ii) the selection phase in which the presence or absence of the wireless power receiving apparatus (not shown) is to be detected, the controller 206 generates a second pulse signal S6_2 at a predetermined time interval (which will also be referred to as the "object detection interval") $T_{OFF}$ for controlling the driver 204. In the Qi standard, the generation of the second pulse signal S6_2 corresponds to an analog ping phase.

The controller 206 measures each time interval $T_{OFF}$ based on the second clock signal CLK2. Furthermore, during each object detection interval $T_{OFF}$, the controller 206 negates (for example, sets to low level) the enable signal EN1 so as to set the first oscillator 230 to the disabled state.

With the present embodiment, during each object detection period (object detection duration) $T_{ON}$ in which the second pulse signal S6_2 is generated in the selection phase, the controller 206 negates the enable signal EN so as to set the first oscillator 230 to the disabled state. Furthermore, the controller 206 generates the second pulse signal S6_2 according to the second clock signal CLK2.

The second pulse signal S6_2 is configured to have the same frequency as the resonance frequency fr of the transmission antenna 201. Thus, by setting the frequency f2 of the second clock signal CLK2 to a value that is equal to the resonance frequency fr, the second pulse signal S6_2 can be generated in a simple manner by means of level shifting, phase shifting, or the like.

The controller 206 includes a first pulse signal generating unit 240, a second pulse signal generating unit 242, a pre-driver 224, and a sequencer 244.

In the power transfer phase, the first pulse signal generating unit 240 generates a first pulse signal S6_1 using the first clock signal CLK1. For example, the first pulse signal generating unit 240 includes a digital counter, and counts the first clock signal CLK1 so as to generate the first pulse signal S6_1 having a frequency (period) that corresponds to the electric power control data S5. The configuration of the first pulse signal generating unit 240 is not restricted in particular.

In the power transfer phase, the pre-driver 224 switches on and off the transistors M1 through M4 of the driver 204 according to the first pulse signal S6_1. The first pulse signal generating unit 240 may perform a dead time control operation in order to prevent the transistors M1 and M3 from turning on at the same time, and in order to prevent the transistors M2 and M4 from turning on at the same time. Alternatively, the pre-driver 224 may execute such a dead time control operation.

During the object detection period $T_{ON}$ in the selection phase, the second pulse signal generating unit 242 generates the second pulse signal S6_2 according to the second clock signal CLK2. As a simplest example, a second clock signal CLK2 having a duty ratio of 50% may be employed as the pulse signal S6_2 to be supplied to the transistors M1 and M4, and an inverted signal obtained by inverting the second clock signal CLK2 may be employed as the pulse signal S6_2 to be supplied to the transistors M2 and M3. The configuration of the second pulse signal generating unit 242 is not restricted in particular.

During the object detection period $T_{ON}$, the pre-driver 224 switches on and off the transistors M1 through M4 of the driver 204 according to the second pulse signal S6_2. The second pulse signal generating unit 242 may perform a dead time control operation. Also, the pre-driver 224 may execute such a dead time control operation.

The sequencer 244 is configured as a so-called state machine. The sequencer 244 switches its state according to the flowchart shown in FIG. 2, which controls the operations of the first pulse signal generating unit 240, the second pulse signal generating unit 242, and the first oscillator 230. Specifically, with such a pre-driver 224, in the selection phase, the sequencer 244 counts the second clock signal CLK2 so as to measure the object detection interval $T_{OFF}$ and the object detection period $T_{ON}$.

The sequencer 244 generates the enable signal EN, and outputs the enable signal EN thus generated to the first oscillator 230 via a standby (STB) terminal. Specifically, in the power transfer phase, the sequencer 244 asserts the enable signal EN. In the selection phase, the sequencer 244 negates the enable signal EN. It should be noted that the sequencer 244 preferably stops the operation of the second oscillator 232 in the power transfer phase in which the second clock signal CLK2 is not used.

It should be noted that the configuration of the controller 206 is not restricted to such an arrangement shown in FIG. 4.

The above is the configuration of the power transmission apparatus 200. Next, description will be made regarding the operation of the power transmission apparatus 200.

Figure 5:
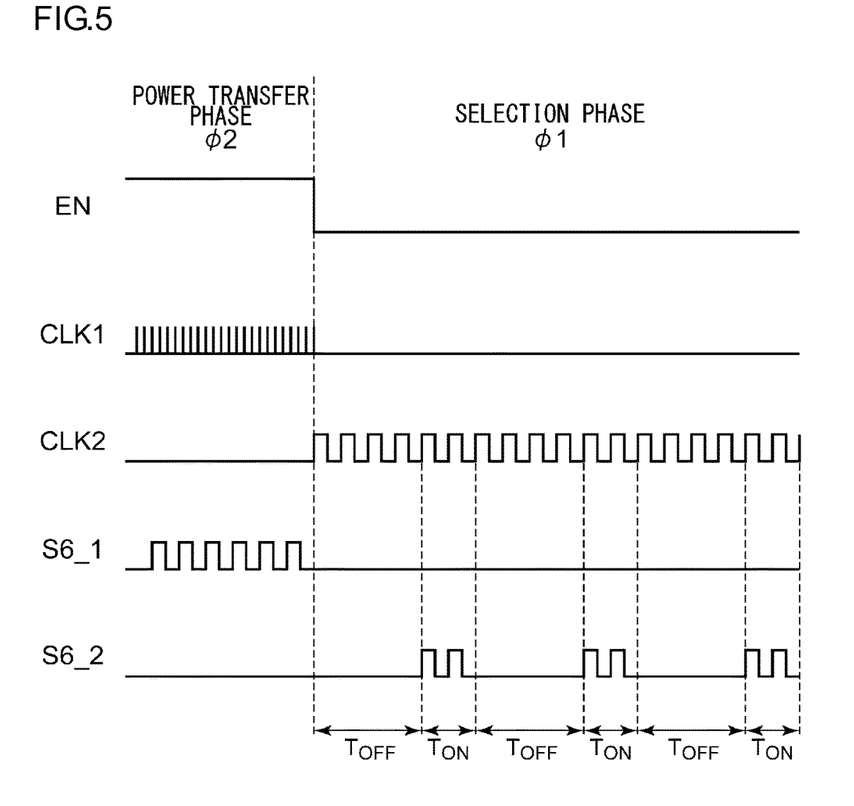
FIG. 5 is a time chart showing the operation of the power transmission apparatus shown in FIG. 4.

FIG. 5 is a time chart showing the operation of the power transmission apparatus 200 shown in FIG. 4. Before the time point t0, the power transmission apparatus 200 is set to the power transfer phase φ2. In this phase, the enable signal EN is asserted so as to generate the first clock signal CLK1. The controller 206 generates the first pulse signal S6_1 based on the first clock signal CLK1. Following this, electric power is supplied to the power receiving apparatus.

At the time point t0, the phase transits to the selection phase φ1. At this point, the enable signal EN is negated, which stops the operation of the first oscillator 230. Instead of the first oscillator 230, the second oscillator 232 starts to operate, thereby generating the second clock signal CLK2. The controller 206 measures the object detection interval $T_{OFF}$ and the burst time $T_{ON}$ using the second clock signal CLK2. During the burst period $T_{ON}$, the controller 206 generates the second pulse signal S6_2 using the second clock signal CLK2.

The above is the operation of the power transmission apparatus 200.

With such a power transmission apparatus 200, in the selection phase φ1, such an arrangement allows the operation of the first oscillator 230, which has large power consumption, to be stopped. Instead, such an arrangement is capable of executing an analog ping phase operation by means of the second oscillator 232 which has only relatively small power consumption.

Furthermore, in the selection phase φ1, the operation frequency of the controller 206 is reduced from the first frequency f1 to the second frequency f2. Thus, such an arrangement allows the power consumption of the controller 206 to be reduced, in addition to the power consumption of the oscillator, as compared with the power transmission apparatus 200r shown in FIG. 3.

Description has been made regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

First Modification

With the resonance frequency of the transmission antenna 201 as fr, the second frequency f2 may be set to $2^N \times fr$ (N represents an integer). When N>0, the controller 206 may divide the second clock signal CLK2 by $2^N$ so as to generate the second pulse signal S6_2. When N<0, the controller 206 may multiply the second clock CLK2 by $2^N$ so as to generate the second pulse signal S6_2.

Second Modification

Figure 6:
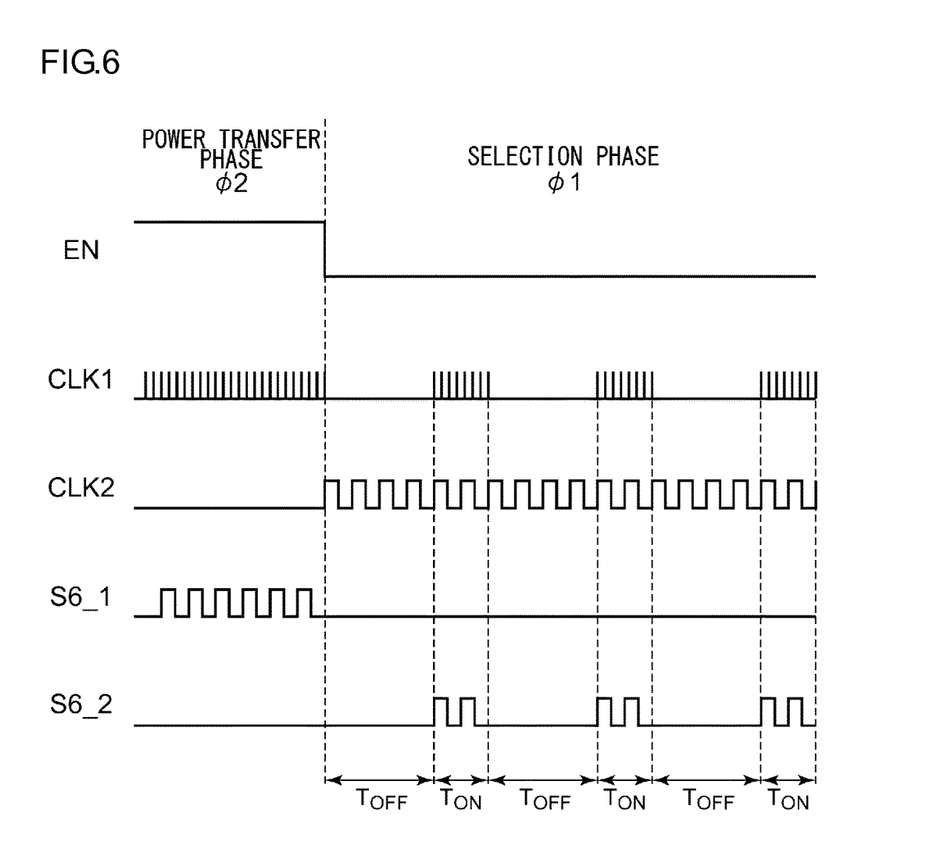
FIG. 6 is a time chart showing the operation of a power transmission apparatus according to a second modification.

During the object detection period $T_{ON}$ in the selection phase, the controller 206 may assert the enable signal EN1 so as to set the first oscillator 230 to the oscillation state, and may generate the second pulse signal S6_2 based on the first clock signal CLK1. FIG. 6 is a time chart showing the operation of the power transmission apparatus 200 according to a second modification.

With such a second modification, the first clock signal CLK1 may preferably be input to the second pulse signal generating unit 242 shown in FIG. 4, instead of the second clock signal CLK2. Also, the second pulse signal generating unit 242 may be configured using a digital counter in the same way as with the first pulse signal generating unit 240.

With such a modification, during the object detection period $T_{ON}$, the second pulse signal S6_2 is generated based on the first clock signal CLK1 having a high frequency. Thus, such an arrangement allows the frequency and the duty ratio of the second pulse signal S6_2 to be controlled with high precision.

It should be noted that the length of the object detection period $T_{ON}$ may be measured using the second clock signal CLK2. Also, the length of the object detection period $T_{ON}$ may be measured using the first clock signal CLK1. In the latter arrangement, the operation of the second oscillator 232 may be stopped during the object detection period $T_{ON}$.

Third Modification

Description has been made in the embodiment regarding a wireless power transmission apparatus that conforms to the Qi standard. The present invention is not restricted to such an arrangement. Also, the present invention is applicable to a wireless power transmission apparatus employed in a system that resembles the Qi standard. Also, the present invention is applicable to a power transmission apparatus 200 that conforms to a standard which will be developed in the future.

While the preferred embodiments of the present invention have been described using specific terms, such description is for illustrative purposes only, and it is to be understood that changes and variations may be made without departing from the spirit or scope of the appended claims.

What is claimed is:

1. A control circuit employed in a wireless power transmission apparatus comprising: a transmission antenna, a driver connected to the transmission antenna, and a first oscillator, the control circuit being structured to control the driver, wherein the first oscillator is structured to be capable of switching its state according to an enable signal, between an oscillation state in which the first oscillator generates a first clock signal having a first frequency and a disabled state in which the first clock is stopped, the control circuit comprising:
   a second oscillator structured to oscillate at a second frequency that is lower than the first frequency so as to generate a second clock signal; and
   a controller coupled to receive the first clock signal and the second clock signal, and structured such that, (i) in a power transfer phase in which electric power is transmitted to a wireless power receiving apparatus, the enable signal is asserted so as to set the first oscillator to the oscillation state, and a first pulse signal is generated based on the first clock signal so as to control the driver, and such that, (ii) in a selection phase in which the presence or absence of the wireless power receiving apparatus is detected, the enable signal is negated so as to set the first oscillator to the disabled state, and a second pulse signal is generated at a predetermined time interval so as to control the driver, and the time interval is measured based on the second clock signal.

2. The control circuit according to claim 1, wherein, with a resonance frequency of the transmission antenna as fr, the second frequency is set to $2^N \times fr$ (N represents an integer).

3. The control circuit according to claim 1, wherein the second frequency is set to a value which is equal to the resonance frequency fr of the transmission antenna.

4. The control circuit according to claim 1, structured to conform to a Qi standard.

5. The control circuit according to claim 1, monolithically integrated on a single semiconductor substrate.

6. A wireless power transmission apparatus comprising:
a transmission antenna;
a driver connected to the transmission antenna;
a first oscillator structured to switch its state between a disabled state and an oscillation state in which the first oscillator generates a first clock signal having a first frequency; and
the control circuit according to claim 1, structured to control the driver.

7. A wireless power transmission apparatus comprising:
a transmission antenna;
a driver connected to the transmission antenna;
a first oscillator structured to switch its state between an oscillation state in which the first oscillator generates a first clock signal having a first frequency and a disabled state in which the first clock is stopped;
a second oscillator structured to oscillate at a second frequency that is lower than the first frequency so as to generate a second clock signal; and
a controller structured to receive the first clock signal and the second clock signal, and structured such that, (i) in a power transfer phase in which electric power is transmitted to a wireless power receiving apparatus, the first oscillator is set to the oscillation state, and a first pulse signal is generated based on the first clock signal so as to control the driver, and such that, (ii) in a selection phase in which the presence or absence of the wireless power receiving apparatus is detected, the enable signal is negated so as to set the first oscillator to the disabled state, and a second pulse signal is generated at a predetermined time interval based on the second clock signal so as to control the driver, and the time interval is measured based on the second clock signal.

8. The wireless power transmission apparatus according to claim 7, wherein, with a resonance frequency of the transmission antenna as fr, the second frequency is set to $2^N \times fr$ (N represents an integer).

9. The wireless power transmission apparatus according to claim 7, wherein the second frequency is set to a value which is equal to the resonance frequency fr of the transmission antenna.

10. The wireless power transmission apparatus according to claim 7, structured to conform to a Qi standard.

11. A control method for a wireless power transmission apparatus, wherein the wireless power transmission apparatus comprises:
a transmission antenna;
a driver connected to the transmission antenna;
a first oscillator structured to generate a first clock signal having a first frequency; and
a second oscillator structured to generate a second clock signal having a second frequency that is lower than the first frequency,
and wherein the control method comprises:
an operation in which, in a power transfer phase in which electric power is transmitted to a wireless power receiving apparatus, the first oscillator is set to the oscillation state, and a first pulse signal is generated based on the first clock signal so as to control the driver;
an operation in which, in a selection phase in which the presence or absence of the wireless power receiving apparatus is detected, the first oscillator is set to the disabled state and a second pulse signal is generated at a predetermined time interval so as to control the driver based on the second clock signal;
an operation in which the time interval is measured based on the second clock signal; and
an operation in which the driver is controlled according to the first pulse signal and the second pulse signal so as to apply a driving signal to the transmission antenna.

* * * * *